United States Patent
Lu

(10) Patent No.: US 10,144,861 B2
(45) Date of Patent: Dec. 4, 2018

(54) SURFACE ACTIVE ADDITIVES FOR OIL-BASED MUD FILTER CAKE BREAKERS

(71) Applicant: M-I L.L.C., Houston, TX (US)

(72) Inventor: Shaohua Lu, Katy, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 14/403,928

(22) PCT Filed: May 31, 2013

(86) PCT No.: PCT/US2013/043525
§ 371 (c)(1),
(2) Date: Nov. 25, 2014

(87) PCT Pub. No.: WO2013/181490
PCT Pub. Date: Dec. 5, 2013

(65) Prior Publication Data
US 2015/0337195 A1    Nov. 26, 2015

Related U.S. Application Data

(60) Provisional application No. 61/653,768, filed on May 31, 2012.

(51) Int. Cl.
| | | |
|---|---|---|
| C09K 8/72 | (2006.01) | |
| C09K 8/52 | (2006.01) | |
| E21B 37/00 | (2006.01) | |
| C09K 8/60 | (2006.01) | |

(52) U.S. Cl.
CPC .............. *C09K 8/52* (2013.01); *C09K 8/602* (2013.01); *E21B 37/00* (2013.01)

(58) Field of Classification Search
CPC ........ C09K 8/72; C09K 2208/32; C09K 8/74; C09K 8/86; C09K 8/52; C09K 8/528; C09K 8/035; C09K 8/54; C09K 8/602; C09K 2208/20; C09K 2208/26; C09K 2208/28; C09K 8/60; C09K 8/64; C09K 8/68; C09K 8/70; C09K 8/82; C09K 8/90; C09K 8/92; E21B 43/16; E21B 37/00; E21B 37/06
See application file for complete search history.

(56) References Cited

U.S. PATENT DOCUMENTS

| | | | |
|---|---|---|---|
| 3,785,438 A | 1/1974 | Jackson et al. | |
| 3,872,018 A | 3/1975 | Alexander | |
| 4,561,985 A | 12/1985 | Glass, Jr. | |
| 5,627,144 A * | 5/1997 | Urfer | A61K 8/45 507/211 |
| 5,707,957 A | 1/1998 | Yianakopoulos et al. | |
| 5,783,527 A | 7/1998 | Dobson, Jr. et al. | |
| 5,891,836 A * | 4/1999 | Kacher | C11D 3/182 510/237 |
| 6,090,754 A | 7/2000 | Chan et al. | |
| 6,173,780 B1 * | 1/2001 | Collins | C09K 8/524 166/300 |
| 6,881,349 B2 | 4/2005 | Mueller | |
| 2003/0100452 A1 | 5/2003 | Mueller et al. | |
| 2004/0040706 A1 | 3/2004 | Hossaini et al. | |
| 2005/0161219 A1 | 7/2005 | Hossaini et al. | |
| 2006/0258541 A1 | 11/2006 | Crews | |
| 2007/0027253 A1 | 2/2007 | Jones et al. | |
| 2008/0110618 A1 | 5/2008 | Quintero et al. | |
| 2008/0169102 A1 * | 7/2008 | Carbajal | C09K 8/52 166/300 |
| 2008/0171669 A1 | 7/2008 | Chan | |
| 2009/0162337 A1 * | 6/2009 | Gross | A61K 9/5146 424/94.6 |
| 2009/0286701 A1 * | 11/2009 | Davidson | C09K 8/52 507/235 |
| 2010/0263863 A1 * | 10/2010 | Quintero | C09K 8/40 166/267 |
| 2010/0300967 A1 | 12/2010 | Dakin et al. | |

FOREIGN PATENT DOCUMENTS

WO    2012/003356 A2    1/2012

OTHER PUBLICATIONS

International Search Report and Written Opinion for corresponding PCT Application No. PCT/US2013/043525, dated Aug. 27, 2013, 12 pages.
Examination report for the equivalent GB patent application 1421641.0 dated Dec. 22, 2016.
Examination report for the equivalent GB patent application 1421641.0 dated Mar. 9, 2017.

* cited by examiner

*Primary Examiner* — Kumar R Bhushan
(74) *Attorney, Agent, or Firm* — David J. Smith

(57) ABSTRACT

Described is a method including emplacing a breaker fluid into a wellbore drilled with an oil-based drilling fluid that forms an oil-based filter cake. The breaker fluid includes a non-oleaginous base fluid and a surfactant blend comprising an alkyl polyglycoside, an ethoxylated alcohol, and a triethyleneglycol monobutyl ether. The method further includes allowing the breaker fluid to break the oil-based filter cake.

21 Claims, 1 Drawing Sheet

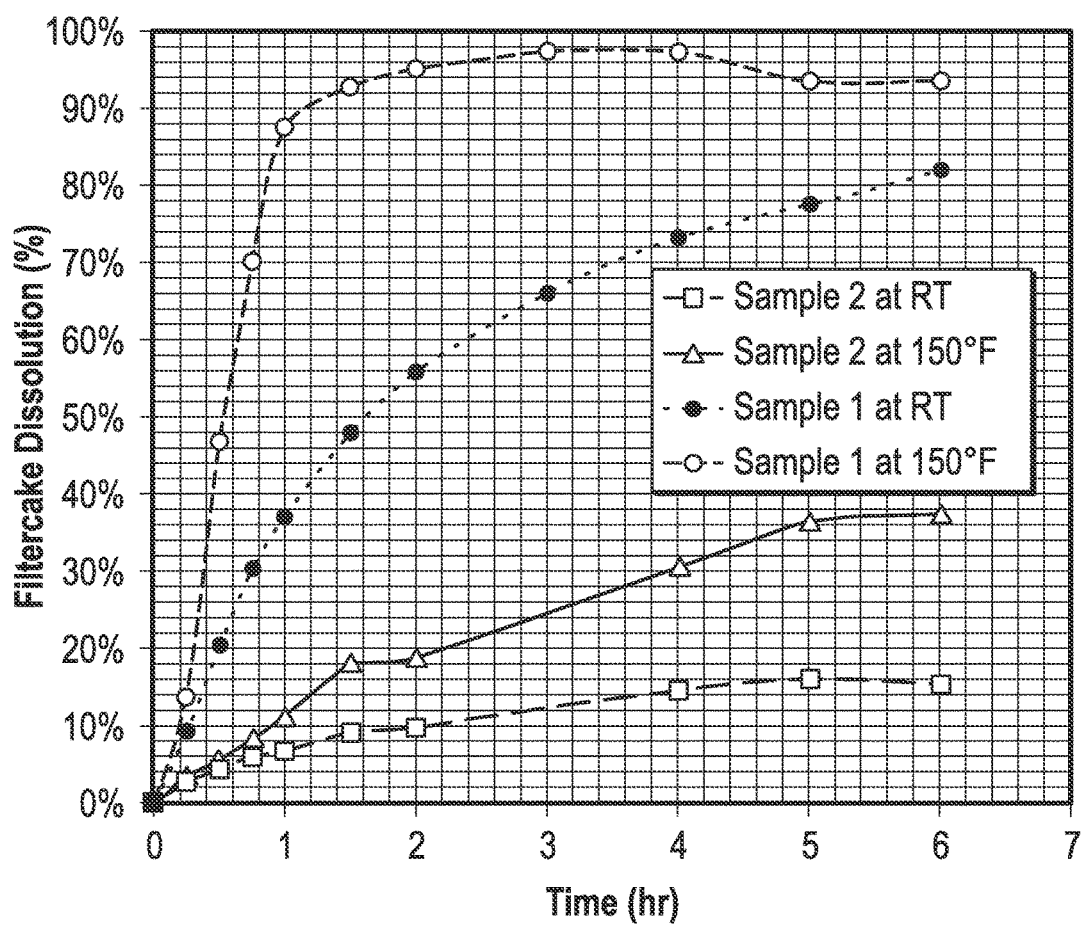

SURFACE ACTIVE ADDITIVES FOR OIL-BASED MUD FILTER CAKE BREAKERS

This application claims priority as a U.S. National Stage Application of Patent Cooperation Treat (PCT) of PCT/US2013/043525, filed May 31, 2013, which claims priority to U.S. Provisional Patent Application No. 61/653,768, filed May 31, 2012. The disclosure of each of the priority applications is incorporated by reference herein in its entirety.

BACKGROUND

When completing wells in earth formations, various fluids are employed in the well for a variety of reasons. Common uses for wellbore fluids, also known as drilling fluids, drilling muds, muds, or drill-in fluids, include: lubrication and cooling of drill bit cutting surfaces during general drilling operations or drilling in a targeted petroliferous formation, suspending dislodged formation pieces from beneath a drill bit and transporting them up the annulus to the surface, controlling formation fluid pressure to prevent blowouts, maintaining well stability and minimizing fluid loss into the formation through which the well is being drilled, fracturing the formation in the vicinity of the well, displacing the fluid within the well with another fluid, cleaning the well, testing the well, transmitting hydraulic horsepower to the drill bit, emplacing a packer, abandoning the well or preparing the well for abandonment, and otherwise treating the well or the formation.

Fluids or muds used in drilling a wellbore often include a base fluid, which is commonly water, diesel or mineral oil, or a synthetic compound. Weighting agents (e.g., barium sulfate, barite, etc.) may be added to increase density, and clays such as bentonite, for example, may be added to help remove cuttings from the well and to form a filter cake on the walls of the hole. Other additives may be added to the wellbore fluids that serve specific functions.

During drilling operations, one way of protecting the formation is by forming a filter cake on the surface of the subterranean formation which prevents both the filtration of formation fluids into the wellbore and the loss of wellbore fluids into the formation. Filter cakes are formed when particles suspended in a wellbore fluid coat and plug the pores in the subterranean formation, such that the filter cake acts as a barrier and decreases the fluid permeability of the wellbore. A number of ways of forming filter cakes are known in the art, including the use of bridging particles, cuttings created by the drilling process, polymeric additives, and precipitates. Filter cakes may be formed, for example, during the drilling process by filtration of some amount of the drilling fluid into the formation, or during completion operations when a fluid loss pill (i.e. a viscous pill) used as a spot treatment in a region of the well experiencing fluid loss is injected into a well.

After any completion operations have been accomplished, the filter cake (formed during drilling and/or completion) remaining on the sidewalls of the wellbore may be removed. Although filter cake formation and use of fluid loss pills occur during drilling and completion operations, the barriers can be an impediment to the production of hydrocarbon or other fluids from the well if, for example, the rock formation is still plugged by the barrier. In addition, dislodged filter cake fragments can pose difficulties during production, such as plugging sand screens present within the wellbore. Because filter cake is compact, it often adheres strongly to the formation and may not be readily or completely flushed out of the formation by fluid action alone.

To remove filter cakes and fluid loss pills prior to production, breaker fluids are introduced to the wellbore to remove residual filter cake and fluid loss pills. Breaker fluids may contain, for example, solvents, acids, oxidizers, or enzymes, and may destroy the integrity of a residual filter cake created during the drilling process by removing some or all fluid components, or by degrading the solids that form the filter cake or fluid loss pill. The composition of the breaker fluids depends on the type of drilling fluid and properties of the filter cakes, but breaker fluids are often aqueous solutions. However, when using an oil-based drilling fluid, incompatibilities with aqueous breaker fluids can decrease the efficiency and speed of filter cake removal.

Thus, it is desirable to continually develop compositions and methods to aid and improve the ability to remove filter cakes, with more complete removal, and while minimizing or reducing damage to the formation.

SUMMARY

In one aspect, embodiments disclosed herein relate to a breaker fluid which may include a non-oleaginous base fluid, and a surfactant blend which may include, but is not limited to, an alkyl polyglycoside, an ethoxylated alcohol, and a triethyleneglycol monobutyl ether.

In another aspect, embodiments disclosed herein relate to a method including emplacing a breaker fluid which may include a non-oleaginous base fluid, and a surfactant blend which may include, but is not limited to, an alkyl polyglycoside, an ethoxylated alcohol, and a triethyleneglycol monobutyl ether.

In yet another aspect, embodiments disclosed herein relate to a method which may include emplacing a breaker fluid into a wellbore drilled with an oil-based drilling fluid that forms an oil-based filter cake, and allowing the breaker fluid to break the oil-based filter cake. The breaker fluid may include a non-oleaginous base fluid, and a surfactant blend which may include, but is not limited to, an alkyl polyglycoside, an ethoxylated alcohol, and a triethyleneglycol monobutyl ether This summary is provided to introduce a selection of concepts that are further described below in the detailed description. This summary is not intended to identify key or essential features of the claimed subject matter, nor is it intended to be used as an aid in limiting the scope of the claimed subject matter. Other aspects and embodiments of the disclosure will be apparent from the following description and the appended claims.

FIGURES

FIG. 1 is a graph illustrating filter cake dissolution relative to time for a filter cake exposed to a breaker fluid in accordance with embodiments of the present disclosure.

DETAILED DESCRIPTION

Embodiments disclosed herein relate to wellbore fluids and methods of using such wellbore fluids for completion operations. In one aspect, embodiments disclosed herein relate to a breaker fluid composition and methods for removing and dispersing filter cakes and fluid loss pills using a breaker fluid containing a surfactant blend including, but not limited to, an alkyl polyglycoside, an ethoxylated alcohol, and triethyleneglycol monobutyl ether.

In another aspect, embodiments disclosed herein relate to a breaker fluid composition and methods for removing an oil-based filter cake or fluid loss pill, in which the breaker fluid contains an acid. In yet another embodiment, the breaker fluid may also contain a delayed acid source, which hydrolyzes to release an acid and, when used in combination with the surfactant blend of the present disclosure, may aid in the degradation of an oil-based filter cake. The breaker fluid, also referred to as a breaker, may oxidize, dissolve, and/or break-up polymeric components of the filter cake.

As discussed above, filter cakes are formed on walls of a subterranean borehole (or along the interior of a gravel pack screen, for example) to reduce the permeability of the walls into and out of the formation (or screen). Some filter cakes are formed during the drilling stage to limit losses from the well bore and protect the formation from possible damage by fluids and solids within the well bore, while others are formed from spotted fluid loss pills to similarly reduce or prevent the influx and efflux of fluids across the formation walls. Further, in gravel packing, it may be desirable to deposit a thin filter cake on the inside surface of a gravel pack screen to effectively block fluid (i.e, completion brines) from invading the formation. This often occurs when a mechanical fluid loss device fails.

Filter cakes and fluid loss pills are often formed from fluids that contain polymers such as polysaccharide polymers including starch derivatives, cellulose derivatives and biopolymers. Specifically, such polymers may include hydroxypropyl starch, hydroxyethyl starch, carboxymethyl starch, carboxymethyl cellulose, hydroxyethyl cellulose, hydroxypropyl cellulose, methyl cellulose, dihydroxypropyl cellulose, xanthan gum, gellan gum, welan gum, and schleroglucan gum, in addition to their derivatives thereof, and crosslinked derivatives thereof, tannins, humates, polyphosphates or phosphate-containing materials, lignite materials, lignosulfonates, oxidized asphalt, gilsonite, and synthetic polymers (including swellable polymers and gels) such as polyamide resins, polyacrylates, polyacrylate esters, etc. Further, one of ordinary skill in the art would appreciate that such list is not exhaustive and that other natural and/or synthetic polymers may be present in the filter cakes/pills to be degraded by the breaker fluids and systems of the present disclosure.

Further, various types of solids may optionally be suspended in wellbore fluids to bridge or block the pores of a subterranean formation in a filter cake. Such solids include those described in U.S. Pat. Nos. 4,561,985, 3,872,018, and 3,785,438, which are herein incorporated by reference in their entirety. For the purposes of the present disclosure, of particular interest are those solids soluble in acid solutions. Representative acid soluble bridging solids may include calcium carbonate, limestone, marble, dolomite, iron carbonate, and iron oxide. However, other solids may be used without departing from the scope of the present disclosure. Other representative solids include water soluble and oil soluble solids as described in U.S. Pat. No. 5,783,527.

Surfactant Blend

The surfactant blend of the present disclosure may be used to disrupt and assist in the removal of oil-based filter cakes or fluid loss pills used in fluid loss control applications, but may also be used to disrupt and/or assist in the removal of water-based filter cakes as well. The surfactants may enhance the removal of filter cakes or fluid loss pills from wellbore walls by increasing the interaction between the oil-based filter cakes or fluid loss pills present on the walls of the wellbore and the aqueous breaker fluids disclosed herein. Surfactants may also act to increase the mobility of the aqueous breaker fluid throughout oil-based materials, aiding in the solubilization of the filter cake, fluid loss pill, or gravel pack and dispersing solids contained therein.

The surfactant blend used in the wellbore fluid of the present disclosure may be a system that includes, but is not limited to, an alkyl polyglycoside, an ethoxylated alcohol, and a triethyleneglycol monobutyl ether, each of which is discussed below. It is also within the scope of the present disclosure that one or more of each type of component may be used in the surfactant blend, i.e., the surfactant blend may contain one or more alkyl polyglycosides, one or more ethoxylated alcohols, and one or more triethyleneglycol monobutyl ethers. The surfactant blend herein may be compatible with standard aqueous breaker fluids and additives, such as acids, delayed acid sources, and oxidants known by those skilled in the art.

Alkyl Polyglycosides

Alkyl polyglycosides may be carbohydrate or saccharide derivates that function as nonionic biodegradable surfactants and have the general formula:

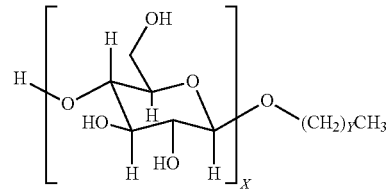

where the oligosaccharide portion contains one or more repeat units X, which may vary in number from 1 to 4. The alkyl portion of the alkyl polyglycoside may include a hydrocarbon tail containing a carbon chain length that may vary from 4 to 25 (with Y ranging from 3-24). In another embodiment, the carbon chain length may range from C8-C10 (Y values of 7-9). Suitable alkyl polyglycosides may include, for example, alkyl polyglucosides such as DESULF GOS-P-60WCG™ (DeForest) or Triton CG 110™ (Dow Chemical).

In an embodiment, the alkyl polyglycosides may be incorporated within a breaker fluid, wherein the total volume of the alkyl polyglycoside is 1-20% of the total volume of the breaker fluid. In other embodiments, the alkyl polyglycoside may make up 2.5-10% of the total volume of the breaker fluid.

In another embodiment, the alkyl polyglycoside may have a general formula $R^1OR^2$, where $R^1$ is a glucose oligosaccharide comprising 1 to 4 glucose units and $R^2$ is an alkyl chain comprising 4 to 25 carbons. As used herein, glucose oligosaccharide may include any oligomer and/or polymer of glucose. It is in the scope of the present disclosure that the glucose units of glucose oligosaccharide may be linked in a repeating manner, and that glucose oligosaccharide may comprise any number of glucose units. Further, the $R^2$ alkyl chain may comprise any number of carbon atoms.

Ethoxylated Alcohols

The ethoxylated alcohol surfactants of the present disclosure may be expressed as the formula $(R^1)_N(R^2)_M(R^3)_K$, which is also illustrated below:

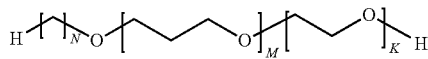

where $R^1$ is a hydrocarbon chain, $R^2$ represents propylene oxide, and $R^3$ represents ethylene oxide. It is also noted that, while the above formula indicates that the molecule contains block units of each of $R^1$, $R^2$, and $R^3$ it is also within the scope of the present disclosure that the units may alternate along the chain. The selection of N, M, and K may be based on the desired hydrophilic-lipophilic balance (HLB) for the molecule.

In an embodiment, the number of carbons in the hydrocarbon chain and the number of propylene oxide repeats can be calculated by the inequality $20<(3N)+M<40$. In another embodiment, the number of ethylene oxide repeats may range from 6 to 15 (i.e., $6 \leq K \leq 15$). In another embodiment, the HLB value of the ethoxylated alcohol may range from 10 to 15. In yet another embodiment, the ethoxylated alcohol may contain no polypropylene oxide groups. Examples of commercially available ethoxylated alcohols suitable for the application of the current disclosure include TOMADOL™ N91-8 and TOMADOL™ N91-6 (provided by Air Products) and ECO™ 9 (Dow Chemical).

In an embodiment, the ethoxylated alcohol may be incorporated within a breaker fluid, wherein the total volume of the ethoxylated alcohol is 0.5-10% of the total volume of the breaker fluid. In other embodiments the ethoxylated alcohol may make up 1.25-5% of the total volume of the breaker fluid.

Triethyleneglycol Monobutyl Ethers

Triethyleneglycol monobutyl ether (TEGMBE), also referred to as butoxytriglycol, may be used as a mutual solvent or hydrotrope in the present application, stabilizing organic materials in aqueous solvents or brines. In some embodiments, the TEGMBE may be substantially completely soluble in both oleaginous and non-oleaginous phases.

The Applicant has discovered that TEGMBE may have advantages over other mutual solvents, which may include greater solubility in aqueous solvents and brines (up to 8% by volume, roughly 3 times that of comparable mutual solvents such as EGMBE), exhibits no phase separation when dissolved in aqueous solvents, and has greater solubility in oleaginous fluids. In addition, the applicant has discovered that TEGMBE remains soluble in brine-based wellbore fluids, particularly in temperature ranges of up to 300° F., exhibiting a higher resistance to forming precipitants from solution, or cloud point, in aqueous solutions at elevated temperatures than comparable mutual solvents, including EGMBE.

In an embodiment, TEGMBE may be incorporated within a breaker fluid, wherein the total volume of the triethyleneglycol monobutyl ether is 0.5-10% of the total volume of the breaker fluid. In other embodiments the triethyleneglycol monobutyl ether may make up 1.25-5% of the total volume of the breaker fluid.

Base Fluids

Embodiments of the present disclosure may use a non-oleaginous fluid as the base fluid. As used herein the base fluid is the fluid component that provides the wellbore fluid its characteristic of being capable to make a surface water-wet or oil-wet. Often, the base fluid may be a majority component of the fluidic portion of the wellbore fluid.

Non-oleaginous fluids used in the formulation of the wellbore fluid disclosed herein may be an aqueous liquid. The non-oleaginous liquid may be selected from the group including fresh water, sea water, a brine containing organic and/or inorganic dissolved salts, liquids containing water-miscible organic compounds and combinations thereof. For example, the aqueous fluid may be formulated with mixtures of desired salts in fresh water. Such salts may include, but are not limited to, alkali metal chlorides, hydroxides, or carboxylates, for example.

In various embodiments of the wellbore fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that may be incorporated in a given brine include any one or more of those present in natural seawater or any other organic or inorganic dissolved salts.

Additionally, brines that may be used in the wellbore fluids disclosed herein may be natural or synthetic, with synthetic brines tending to be more simple in constitution as compared to natural brines. In one embodiment, the density of the wellbore fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium. Specific examples of such salts, include but are not limited to, $NaCl$, $CaCl_2$, $NaBr$, $CaBr_2$, $ZnBr_2$, $NaHCO_2$, $KHCO_2$, $KCl$, $NH_4Cl$, $CsHCO_2$, $MgCl_2$, $MgBr_2$, $KH_3C_2O_2$, $KBr$, $NaH_3C_2O_2$ and combinations thereof. In some embodiments the non-oleaginous fluid may form substantially 100 vol % of the wellbore fluid, in other embodiments the non-oleaginous fluid may form 30-90 vol % of the total wellbore fluid, whereas in still other embodiments, the non-oleaginous fluid may form 60-85 vol % of the total wellbore fluid.

Acid Sources

The breaker fluids of the present disclosure may also be formulated to contain an acid source to decrease the pH of the breaker fluid and aid in the degradation of filter cakes within the wellbore. Examples of acid sources that may be used as breaker fluid additives include, but are not limited to, strong mineral acids, such as hydrochloric acid or sulfuric acid, and organic acids, such as citric acid, lactic acid, malic acid, acetic acid, and formic acid. In some embodiments, an organic acid may be present in an amount ranging from 5 to 30 vol % of the wellbore fluid. The breaker fluid may have a pH below 4 or below 3 in another embodiment.

As mentioned above, some embodiments of the present disclosure may include a delayed acid source in the fluid formulation. The delayed acid source, as referred to herein, includes compounds which will release acid following a predetermined amount of time. In particular, compounds that hydrolyze to form acids in situ may be utilized as a delayed acid source. Such delayed acid sources may be provided, for example, by hydrolysis of an ester. Illustrative examples of such delayed acid sources include hydrolyzable anhydrides of carboxylic acids, hydrolyzable esters of carboxylic acids, hydrolyzable esters of phosphonic acid, hydrolyzable esters of sulfonic acid, hydrolyzable esters of lactic acid, and other similar hydrolyzable compounds that are known to those skilled in the art.

Suitable esters may include carboxylic acid esters that achieve hydrolysis at a time that is predetermined based on the known downhole conditions, such as temperature and pH. In embodiments, the delayed acid source component may include a formic, acetic, or lactic acid ester of a $C_2$-$C_{30}$ alcohol, which may be mono- or polyhydric. Other esters that may find use in activating the oxidative breaker of the present disclosure include those releasing $C_1$-$C_6$ carboxylic acids, including hydroxycarboxylic acids formed by the hydrolysis of lactones, such as γ-lactone and δ-lactone). In another embodiment, a hydrolyzable ester of a $C_1$ to $C_6$ carboxylic acid and/or a $C_2$ to $C_{30}$ poly alcohol, including alkyl orthoesters, may be used.

In addition, acid sources may include delayed acid sources such as hydrolysable esters of carboxylic acids, sulfonic acids, phosphoric acids, lactic acids, anhydrides etc. Upon hydrolysis of the ester of an acid, the acid may be released to help break acid-degradable components such as calcium carbonate or aid in destabilizing an emulsion in the case of a filter cake being formed by an invert emulsion fluid.

Delayed acid sources may be incorporated into the breaker fluid composition, wherein the delayed acid source is 5-30% of the total breaker fluid volume in an embodiment. In another embodiment, the delayed acid source may make up 5-50% of the total volume of the breaker fluid.

Breaker Fluid Additives

The breaker fluids of the present disclosure may also include oxidizers, enzymes, or other solvents that are conventionally used to break filter cakes, fluid loss pills, or gravel packs. In some embodiments, using a breaker fluid may include a natural polymer degrading enzyme, for example, a carbohydrase. Examples of such enzymes include, but are not limited to, amylases, pullulanases, and cellulases. In other embodiments, the enzyme may be selected from endo-amylase, exo-amylase, isoamylase, glucosidase, amylo-glucosidase, malto-hydrolase, maltosidase, isomalto-hydrolase or malto-hexaosidase. One skilled in the art would appreciate that selection of an enzyme may depend on various factors such as the type of polymeric additive used in the wellbore fluid being degraded, the temperature of the wellbore, and the pH of wellbore fluid In yet another embodiment, the breaker fluid may include an oxidizing agent, such sodium hypochlorite or peroxides. Suitable oxidizing agents may include hypochlorites, such as lithium and/or sodium hypochlorite and peroxides (including peroxide adducts), other compounds including a peroxy bond such as persulphates, perborates, percarbonates, perphosphates, and persilicates. In a particular embodiment, a peroxide, such as magnesium or calcium peroxide, may be used in the breaker system of the present disclosure. Various breaker fluids and compositions are known in the art and examples are disclosed in Patent Publications 2004/0040706, 2005/0161219, and 2010/0300967, which are incorporated herein by reference.

In another aspect of the present disclosure, embodiments herein relate to methods for removing an oil-based filter cake or fluid loss pill by emplacing into a wellbore, a breaker fluid as disclosed herein. The wellbore may be drilled with an oil-based drilling fluid that forms an oil-based filter cake. Oil-based drilling fluids, also called oil-based muds (OBM), may comprise solid particles suspended in oil with an aqueous solution, such as water or brine, emulsified in the oil, thus oil comprising the continuous phase. In oil-based drilling fluids, the oil may comprise any oil including, but not limited to, alpha-olefins, diesel, mineral oil, esters, or the like. An oil-based filter cake may be formed by the previously mentioned oil-based drilling fluid.

Further, methods herein may include allowing the breaker fluid to degrade the oil-based filter cake. As used herein, degrade may refer to any dissolving, breaking, removing, eroding, weakening, or compromising of integrity, such as of a filter cake. In yet other embodiments, methods herein may include shutting in the well for a period of time. For example, shutting in a well may include closing down a typically producing well.

EXAMPLES

Laboratory scale testing of breaker fluid formulations was performed on filter cakes deposited from the oil-based drilling fluid VERSAPRO™, obtained from M-I SWACO (Houston, Tex.). VERSAPRO™ includes VG PLUS, an organophilic clay viscosifier, VERSACOAT™, an emulsifier and wetting agent; VERSAWET, an organic surfactant; VERSAMOD™, an organic gelling agent; and SAFECARB, a calcium carbonate bridging agent (all commercially available from M-I SWACO). REV DUST is an altered calcium montmorillonite clay to simulate drilling debris, available form Milwhite, Inc. (Houston, Tex.). The formulation and rheological properties of two samples of the VERSAPRO™, samples A and B, are listed in Table 1.

TABLE 1

Formulation of VERSAPRO and rheological properties

| Mud type | A | B |
|---|---|---|
| Base oil (bbl) | 0.47 | 0.47 |
| VG PLUS (ppb) | 5 | 5 |
| VERSACOAT (ppb) | 5 | 5 |
| VESAWET (ppb) | 2 | 2 |
| Lime (ppb) | 5 | 5 |
| VERSAMOD (ppb) | 0.5 | 0.5 |
| 10.74 ppg $CaCl_2$ (bbl) | 0.37 | 0.37 |
| SAFECARB 2 (ppb) | 4 | 4 |
| SAFECARB 10 (ppb) | 10 | 10 |
| SAFECARB 20 (ppb) | 46 | 46 |
| SAFECARB 40 (ppb) | 46 | 46 |
| REVDUST (ppb) | — | 20 |
| Barite (ppb) | — | 20 |
| Density (ppg) | 10.0 | 10.1 |

| Mud Type | A | B |
|---|---|---|
| Temp (° F.) | 150 | 150 |
| RPM | | |
| 600 | 68 | 102 |
| 300 | 41 | 63 |
| 200 | 31 | 49 |
| 100 | 21 | 33 |
| 6 | 8 | 13 |
| 3 | 7 | 12 |
| Gel strength | | |
| 10 sec | 9 | 18 |
| 10 min | 9 | 20 |
| PV | 27 | 39 |
| YP | 14 | 24 |
| ES | 416 | 206 |

Example 1

A filter cake was built from VERSAPRO™ mud type A at relatively high temperature and high pressure (HTHP) for 16 hours on an aloxite disk with a pore diameter of 40 μm at 150° F. (66° C.) at 500 psi. A breaker solution of formic acid was tested with and without a surfactant blend of an alkyl polyglucoside CAS#68515-73-1, an ethoxylated alcohol CAS#68439-46-3, and triethyleneglycol monobutyl ether (TEGMBE), Samples No. 1 and 2 respectively in Table 2.

Filter cake dissolution tests were studied at both room temperature and at 150° F. (66° C.). Breaker solutions were applied to the filter cake for 6 hours and the total weight of the solution was monitored continuously. As calcium carbonate present in the filter cake reacts with the acid, $CO_2$ gas is liberated, causing a decrease in the total weight of the solution. The weight loss was then used to calculate the total dissolution percentage of the filter cake. A graph of filter cake dissolution relative to time is shown in FIG. 1.

TABLE 2

Breaker fluid formulations for Example 1. Percentages are calculated as percent by volume.

| Sample | 1 | 2 |
|---|---|---|
| 12.5 ppg NaBr | 50% | 50% |
| Water | 25% | 35% |
| Formic Acid (88%) | 15% | 15% |
| alkyl polyglucoside | 5% | — |
| Ethoxylated Alcohol | 2.50% | — |
| TEGMBE | 2.50% | — |

Example 2

In a second experiment, a filter cake was built from VERSAPRO™ mud type B (Table 1) at HTHP for 16 hours on an aloxite disk at 150° F. (66° C.) and at 500 psi in a flow cell modified for flowback testing. After formation of the filter cake, the remaining mud is decanted, replaced with a breaker fluid sample, and soaked at 150° F. (66° C.) for 6 hours. After soaking, production flow-back of the cells was measured. An HPHT fluid loss test was performed on each of the discs.

The formulations of the breaker fluids used in this assay and testing results are listed in Table 3, where the breaker fluids were formulated with an alkyl polyglucoside CAS#68515-73-1, an ethoxylated alcohol CAS#68439-46-3, and TEGMBE.

TABLE 3

HTHP test parameters and results. Percentages are calculated as percent by volume.

| Sample | 3 | 4 | 5 | 6 |
|---|---|---|---|---|
| 12.5 ppg NaBr | 50% | 50% | 50% | 50% |
| Water | 20% | 20% | 20% | 20% |
| Formic Acid (88%) | 20% | 20% | 20% | 10% |
| HCl (35%) | — | — | — | 10% |
| Alkyl Polyglucoside | 5% | 5% | 5% | 5% |
| Ethoxylated Alcohol | 2.50% | — | 2.5% | 2.5% |
| EGMBE | — | 5% | 2.5% | 2.5% |
| TEGMBE | 2.50% | — | — | — |
| Break through | 4 hrs | No | No | No |
| Total soaking (hrs) | 6 | 6 | 6 | 6 |
| Flow back ratio | 89% | 52% | 60% | 85% |
| Filter cake Residue (g) | 17.26 | 23.16 | 23.75 | 21.89 |
| Water wet? | Yes | Yes | No | No |
| Pore size (μm) | 20 | 20 | 20 | 40 |
| Spurt (mL) | <0.1 | 1.6 | 1.5 | 1.6 |
| 16 hr fluid loss (mL) | 7.4 | 13.3 | 11.2 | 13.1 |

As shown in Table 3, Sample 3 exhibited penetration through the filter cake or "break through" after a period of 4 hours, and a return to flow after 6 hours of soaking. It is also noted that a "water wet" appearance of the filter cake is a measure of the effective penetration and solvation of the filter cake, with a water wet appearance indicating effective disruption of the filter cake.

Example 3

VERSAPRO™ mud type B (Table 1) was used to build a mud filter cake at relative HTHP for 16 hours on an aloxite disk with a pore diameter of 40 μm at 150° F. (66° C.) and at 500 psi in a flow cell modified for flowback testing. After formation of the filter cake, the remaining mud is decanted, replaced with a breaker fluid sample, and incubated at 150° F. (66° C.) for 16 hours. After soaking, production flow-back of the cells is measured. Breaker formulations and results are listed in Table 4, where Additive A is a formulation of 23% ethylene glycol monobutyl ether (EGMBE); 22.4% of an alkyl benzyl surfactant; 23% D-STRUCTOR™, a delayed acid source available from M-I SWACO (Houston, Tex.); and 31% of a quaternary amine surfactant.

TABLE 4

Breaker solutions and injection testing results. Percentages are calculated as percent by volume.

| Sample | 7 | 8 | 9 |
|---|---|---|---|
| Alkyl Polyglycoside | 5% | 5% | — |
| Ethoxylated Alcohol | 2.5% | 2.5% | — |
| TEGMBE | 2.5% | 2.5% | — |
| Additive A | — | — | 10% |
| Formic acid (88%) | 20% | 20% | 20% |
| 11.6 ppg $CaCl_2$ | 40% | 60% | 40% |
| water | 30% | 10% | 30.0% |
| Total soaking time | 16 hrs | 16 hrs | 16 hrs |
| Return to flow with breaker | 41% | <1% | <1% |
| Return to flow w/o breaker | 86% | <1% | <1% |
| Filter cake residue (grams) | 1.3 | 16.3 | 15.3 |

Example 4

In this example, breaker fluids are combined with a hydrolyzable acid source for delayed breaker applications. A filter cake was built from VERSAPRO™ mud type B (Table 1) at relative HTHP for 16 hours on an aloxite disk with a pore diameter of 40 μm at 150° F. (66° C.) and at 500 psi in a flow cell modified for flowback testing. Following filter cake formation, the mud was decanted, replaced with a breaker fluid sample, and incubated at 230° F. (110° C.) for 72 hours.

A breaker fluid formulation of an alkyl polyglucoside CAS#68515-73-1, an ethoxylated alcohol CAS#68439-46-3, and triethyleneglycol monobutyl ether (TEGMBE) was compared to breaker fluid additives Additive A and DEEPCLEAN™, where DEEPCLEAN™ is a surfactant blend available from M-I SWACO (Houston, Tex.). The breaker formulation and testing results are shown in Table 5, where D-STRUCTOR™ is a delayed acid source available from M-I SWACO (Houston, Tex.); FAZEMUL® is an emulsifier and wetting agent available from M-I SWACO (Houston, Tex.); and Additive B is a formulation containing 30-60% water, 10-30% glutamic acid di-acetic acid (GLDA) tetra-sodium salt, 10-30% GLDA glycolic acid, and <1% formic acid.

As illustrated in Table 5, formulation 12, containing the mixture of alkyl polyglycoside, ethoxylated alcohol, and TEGMBE, shows much higher return to flow after 72-hour soaking and a more complete filter cake removal when compared to formulations 10 and 11.

TABLE 5

HTHP breaker formulations and testing results. Percentages are calculated as percent by volume.

| Sample | 10 | 11 | 12 |
|---|---|---|---|
| Alkyl Polyglycoside | — | — | 5% |
| Ethoxylated Alcohol | — | — | 2.5% |
| TEGMBE | — | — | 2.5% |
| Additive B | 5% | 5% | — |
| DEEPCLEAN | 10% | — | — |
| Additive A | — | 5% | — |
| FAZEMUL | 5% | — | — |
| 11.6 ppg CaCl$_2$ | 22% | 28% | 16% |
| water | 8% | 27% | 34% |
| Total soaking (hours) | 72 | 72 | 72 |
| Return to flow with breaker | <1% | <1% | 13% |
| Return to flow w/o breaker | <1% | <1% | 123% |

Example 5

In this example, a surfactant formulation of an alkyl polyglycoside CAS#68515-73-1, an ethoxylated alcohol CAS#68439-46-3, and triethyleneglycol monobutyl ether (TEGMBE) is compared to two breaker formulations in NaBr brine. A filter cake was built from VERSAPRO™ mud type B (Table 1) at relatively HTHP for 16 hours on an aloxite disk with a pore diameter of 40 μm at 150° F. (66° C.) and at 500 psi in a flow cell modified for flowback testing. Following filter cake formation, the mud was decanted, replaced with a breaker fluid sample, and incubated at 230° F. (110° C.) for 48 hours. Formulations and results are shown in Table 6.

TABLE 6

Brine formulations for delayed breaker fluids. Percentages are calculated as percent by volume.

| Sample | 13 | 14 | 15 |
|---|---|---|---|
| NaBr, 12.5 ppg | 11% | 17% | 14% |
| D-STRUCTOR | 50% | 35% | 40% |
| Additive B | 5% | 5% | — |
| DEEPCLEAN | 10% | — | — |
| FAZEMUL | 5% | — | — |
| Additive A | — | 5% | — |
| Alkyl Polyglycoside | — | — | 5% |
| Ethoxylated Alcohol | — | — | 2.5% |
| TEGMBE | — | — | 2.5% |
| Water | 19% | 38% | 36% |
| Flow back injection, at 5 psi, | <1% | <1% | <1% |
| Flow back injection at 5 psi after decanting the breaker solution | <1% | <1% | 99% |

Example 6

In another test for delayed breaker applications, a breaker fluid formulation containing an alkyl polyglycoside CAS#68515-73-1, an ethoxylated alcohol CAS#68439-46-3, triethyleneglycol monobutyl ether (TEGMBE), and a delayed acid source is compared with a breaker fluid formulation containing a microemulsion product (ME 1). A filter cake was built at relative HTHP for 16 hours on 10 um disk at 157° F. (70° C.) with a field mud sample at 500 psi. The filter cake was then soaked in the selected breaker formulation for 70 hours with constant monitoring for break through. Following 70 hours of soaking in the breaker fluid, a flow back test is performed on the remaining filter cake from the production direction. Delayed acid sources included are D-STRUCTOR™, optimized for hydrolysis at 150° F. (66° C.), and TWLB 20-31-C, a lactate ester that hydrolyzes at 180° F. (82° C.) and is commercially available from CESI Chemical.

TABLE 7

Formulations of delayed breakers in flow back test of field mud derived filter cakes.

| Sample | 16 | 17 |
|---|---|---|
| 14.2 ppg CaBr$_2$ brine | 0.468 bbl | 0.479 bbl |
| Water | 0.195 bbl | 0.277 bbl |
| TWLB 20-31-C | 0.06 bbl | 0.06 bbl |
| D-STRUCTOR | 0.09 bbl | 0.09 bbl |
| ME 1 | 0.187 bbl | — |
| Alkyl Polyglycoside | — | 0.047 bbl |
| Ethoxylated Alcohol | — | 0.0235 bbl |
| TEGMBE | — | 0.0235 bbl |
| Spurt (mL) | 3.5 | 3.7 |
| Total Effluent | 8.5 | 19.5 |
| Breakthrough | No | No |

Although the preceding description has been described herein with reference to particular means, materials, and embodiments, it is not intended to be limited to the particulars disclosed herein; rather, it extends to all functionally equivalent structures, methods and uses, such as are within the scope of the appended claims.

What is claimed is:

1. A breaker fluid comprising:
   a non-oleaginous base fluid;
   an acid source selected from the group consisting of citric acid, lactic acid, malic acid, acetic acid, formic acid, a delayed acid source, and combinations thereof; and
   a surfactant blend comprising an alkyl polyglycoside, an ethoxylated alcohol, and triethyleneglycol monobutyl ether;
   wherein the triethyleneglycol monobutyl ether is about 0.5 to 10 percent of the total volume of the breaker fluid, the alkyl polyglycoside is about 2.5 to 10 percent of the total volume of the breaker fluid, and the ethoxylated alcohol is about 1.25 to 5 percent of the total volume of the breaker fluid.

2. The breaker fluid of claim 1, wherein the non-oleaginous fluid is selected from the group consisting of fresh water, sea water, a brine containing organic and/or inorganic dissolved salts, liquids containing water-miscible organic compounds, and combinations thereof.

3. The breaker fluid of claim 1, wherein the acid source is a delayed acid source and comprises a formic, acetic, lactic acid ester of a mono- or poly-hydric $C_2$-$C_{30}$ alcohol.

4. The breaker fluid of claim 1, wherein the alkyl polyglycoside has the general formula $R^1OR^2$, where $R^1$ is a glucose oligosaccharide comprising 1 to 4 glucose repeats and $R^2$ is an alkyl chain comprising 4 to 25 carbons.

5. The breaker fluid of claim 1, wherein the ethoxylated alcohol is represented by the general formula $(R^1)_N(R^2)_M(R^3)_K$, where $R^3$ is ethylene oxide and K is in the range of 6 to 15, $R^1$ is a hydrocarbon chain, $R^2$ is propylene oxide, and the ratio between $R^1$ and $R^2$ is calculated by the inequality $20<(3N)+M<40$.

6. The breaker fluid of claim 1, further comprising a natural polymer degrading enzyme.

7. The breaker fluid of claim 1, further comprising an oxidizing agent.

8. A method of cleaning a wellbore drilled with an oil-based drilling fluid that forms an oil-based filtercake, the method comprising:
emplacing the breaker fluid of claim 1 into the wellbore;
shutting in the well for a period of time; and
allowing the breaker fluid to break the oil-based filtercake.

9. The method of claim 8, further comprising drilling the wellbore with an oil-based drilling fluid to form an oil-based filtercake on walls thereof.

10. The method of claim 8, wherein the alkyl polyglycoside has the general formula $R^1OR^2$, where $R^1$ is a glucose oligosaccharide comprising 1 to 4 glucose repeats and $R^2$ is an alkyl chain comprising 4 to 25 carbons.

11. The method of claim 8, wherein the ethoxylated alcohol is represented by the general formula $(R^1)_N(R^2)_M(R^3)_K$, where $R^3$ is ethylene oxide and K is in the range of 6 to 15, $R^1$ is a hydrocarbon chain, $R^2$ is propylene oxide, and the ratio between $R^1$ and $R^2$ is calculated by the inequality $20<(3N)+M<40$.

12. The method of claim 8, wherein the breaker fluid further comprises a natural polymer degrading enzyme.

13. The method of claim 8, wherein the breaker fluid further comprises an oxidizing agent.

14. A method comprising:
emplacing the breaker fluid of claim 1 into a wellbore drilled with an oil-based drilling fluid that forms an oil-based filter cake; and
allowing the breaker fluid to degrade the oil-based filter cake.

15. The method of claim 14, wherein the alkyl polyglycoside has the general formula $R^1OR^2$, where $R^1$ is a glucose oligosaccharide comprising 1 to 4 glucose units and $R^2$ is an alkyl chain comprising 4 to 25 carbons.

16. The method of claim 14, wherein the alkyl polyglycoside has the general formula $R^1OR^2$, where $R^1$ is a glucose oligosaccharide comprising 1 to 4 glucose units and $R^2$ is an alkyl chain comprising 4 to 25 carbons.

17. The method of claim 14, wherein the breaker fluid further comprises a natural polymer degrading enzyme.

18. The method of claim 14, wherein the breaker fluid further comprises an oxidizing agent.

19. The method of claim 14 further comprising:
shutting in the well for a period of time.

20. A breaker fluid comprising:
a non-oleaginous base fluid;
an acid source selected from the group consisting of citric acid, lactic acid, malic acid, acetic acid, formic acid, a delayed acid source, and combinations thereof; and
a surfactant blend consisting essentially of an alkyl polyglycoside, an ethoxylated alcohol, and triethyleneglycol monobutyl ether;
wherein the triethyleneglycol monobutyl ether is about 0.5 to 10 percent of the total volume of the breaker fluid, the alkyl polyglycoside is about 2.5 to 10 percent of the total volume of the breaker fluid, and the ethoxylated alcohol is about 1.25 to 5 percent of the total volume of the breaker fluid.

21. The breaker fluid of claim 1, wherein the triethyleneglycol monobutyl ether is about 1.25 to 5 percent of the total volume of the breaker fluid.

* * * * *